United States Patent [19]

Reidemeister et al.

[11] Patent Number: 5,092,174
[45] Date of Patent: Mar. 3, 1992

[54] CAPACITANCE ACCELEROMETER

[75] Inventors: Eric P. Reidemeister, Arlington; Keith W. Kawate, Attleboro Falls, both of Mass.

[73] Assignee: Texas Instruments Incorporated, Dallas, Tex.

[21] Appl. No.: 423,922

[22] Filed: Oct. 19, 1989

[51] Int. Cl.$^5$ ........................................... G01P 15/125
[52] U.S. Cl. ............................... 73/517 R; 73/516 R; 361/278
[58] Field of Search ............... 361/277, 278, 280, 290, 361/303, 304; 73/516 R, 517 R

[56] References Cited

U.S. PATENT DOCUMENTS 3,709,042  1/1973  Lee et al. ........................... 73/561 R
4,435,737  3/1984  Colton ................................. 361/280
4,483,194  11/1984  Rudolf ............................... 73/517 R

OTHER PUBLICATIONS

Neubert, Hermann K. P., *Instrument Transducers 2nd Ed*, Pub. 1975 by Clarendon Press in Oxford, England, pp. 38, 264, 36, 51 & 39.

Primary Examiner—Hezron E. Williams
Assistant Examiner—Craig Miller
Attorney, Agent, or Firm—James P. McAndrews; John A. Haug; Melvin Sharp

[57] ABSTRACT

A capacitive acceleration sensor using a common PWB as one of the plates of the capacitive transducer and the wiring connections thereto. An acceleration input moves a capacitor plate to produce a measurable change in capacitance. An electronic signal conditioner accurately converts the capacitance output to a voltage signal to provide an acceleration sensor featuring accurate DC performance. The transducer and electronics are disposed on a PWB making up a complete sensor package. In a first embodiment, the capacitor comprises a fixed electrode on the PWB and a movable acceleration responsive electrode secured to a support by a conductive resilient member, the support coupled to an electrically conductive region on the PWB spaced from the fixed electrode by a guard ring to minimize stray charge between the capacitor electrodes. In a second embodiment, the movable capacitor electrode is supported at its center by a pair of electrically conductive members, one coupled to an electrically conductive region on a substrate spaced from the movable electrode by a sealing spacer. The fixed capacitor electrode is disposed either on the same substrate or a separate substrate on the opposite side of the movable electrode spaced from the movable electrode by a sealing spacer and having the fixed capacitor electrode thereon. The movable capacitor electrode can be secured at its center or at an edge and can be produced by stamping and/or photoetching and provide a single element where plural elements were previously required.

4 Claims, 3 Drawing Sheets

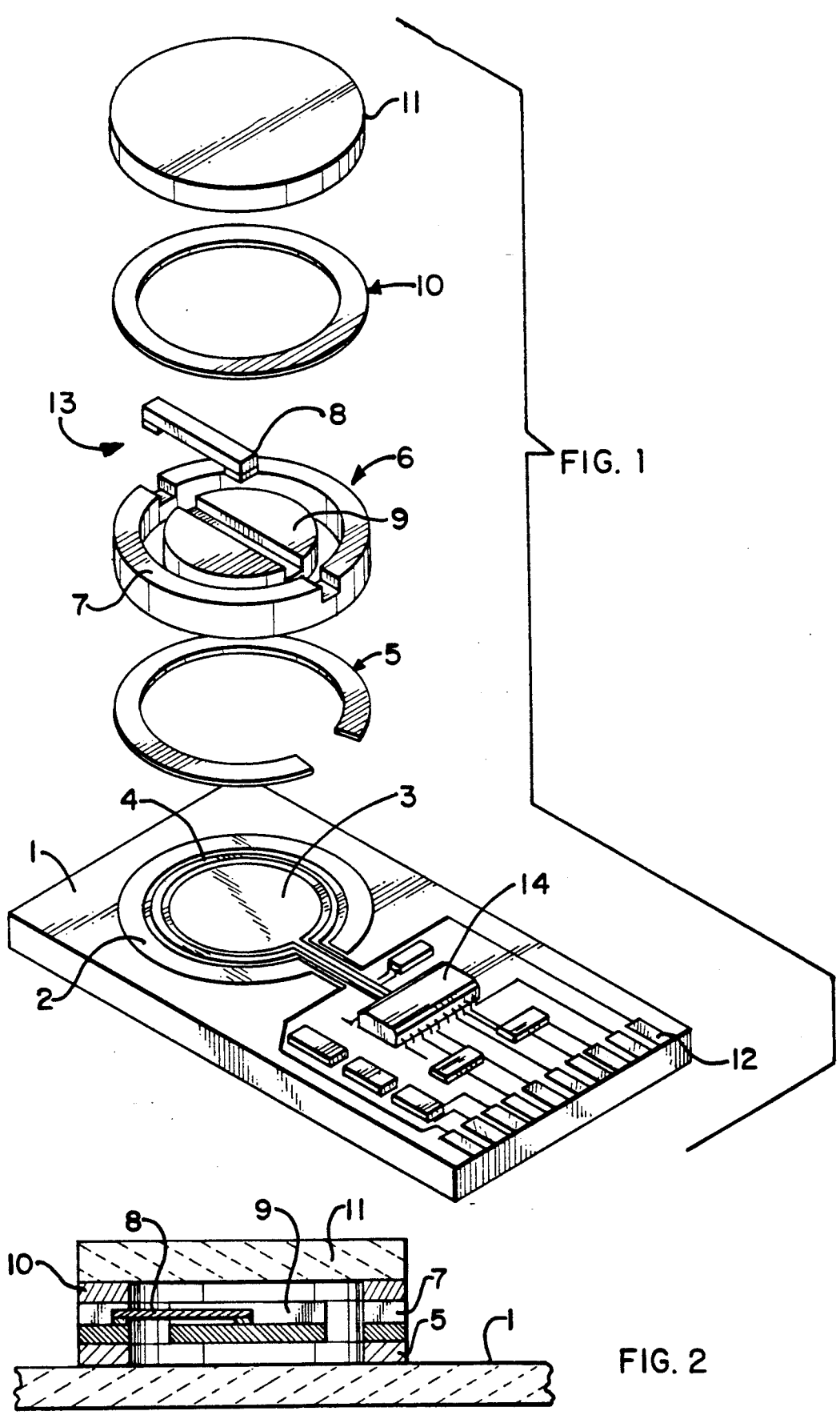

CAPACITANCE ACCELEROMETER

BACKGROUND OF THE INVENTION

1. Field of the Invention

This invention relates to accelerometers for measuring acceleration by measuring the capacitance of a capacitor, the capacitance of which varies with change in acceleration.

2. Brief Description of the Prior Art

Prior art capacitive accelerometers generally utilize an inertial beam and air damping. Examples of typical prior art accelerometers are shown in U.S. Pat. Nos. 3,339,419 of Wilcox, 3,709,042 of Lee, 3,089,343 of Rule, 3,132,521 of Krupick, 3,240,073 of Pitzer, 3,292,059 of Woods, 3,267,740 of Stedman, 4,333,029 of Kolm and 3,988,620 of McDavid. The prior art capacitive accelerometers have generally been complex, resulting in high cost of manufacture. It is therefore apparent that the art always seeks capacitive accelerometers which con be produced in a less costly manner.

SUMMARY OF THE INVENTION

In accordance with the present invention, there is provided a capacitive transducer which minimizes the problems inherent in the prior art as noted above.

Briefly, there is provided a capacitive acceleration sensor which uses a common printed wiring board or substrate as both one of the plates of the capacitive transducer and the wiring connections thereto. The sensor utilizes a single variable capacitor and a fixed reference capacitor. The sensor is designed to measure low "g" accelerations, but can be easily modified to measure higher "g"s. An acceleration input moves a capacitor plate producing a change in capacitance. The sensor utilizes an electronic signal conditioner which accurately converts the capacitance output to a voltage signal. The transducer and electronics are laid out on a printed wiring board making up a complete sensor package. The result is a low "g" acceleration sensor featuring accurate DC performance.

In a first embodiment of the invention, the capacitor comprises a fixed electrode on the PWB and a movable acceleration responsive electrode which is secured to a support by a conductive resilient member, the support being coupled to an electrically conductive region on the PWB which is spaced from the fixed electrode by a guard ring to minimize stray charge passing between the capacitor electrodes.

In accordance with a second embodiment of the invention, the movable capacitor electrode is supported at its center region by a pair of electrically conductive members, one of which is coupled to an electrically conductive region on a substrate spaced from the movable electrode by a sealing spacer. The fixed capacitor electrode is disposed either on the same substrate or on a separate substrate on the opposite side of the movable electrode spaced from the movable electrode by a sealing spacer and having the fixed capacitor electrode thereon.

The movable capacitor electrode can be secured at its center or at an edge. The movable electrode or seismic disk can be produced by stamping and/or photoetching and provide a single element where plural elements were previously required.

BRIEF DESCRIPTION OF THE DRAWINGS

FIG. 1 is an exploded view of an acceleration transducer with printed wiring board in accordance with the present invention;

FIG. 2 is a cross sectional view of the assembled transducer of FIG. 1;

DESCRIPTION OF THE PREFERRED EMBODIMENTS

Figure 3:
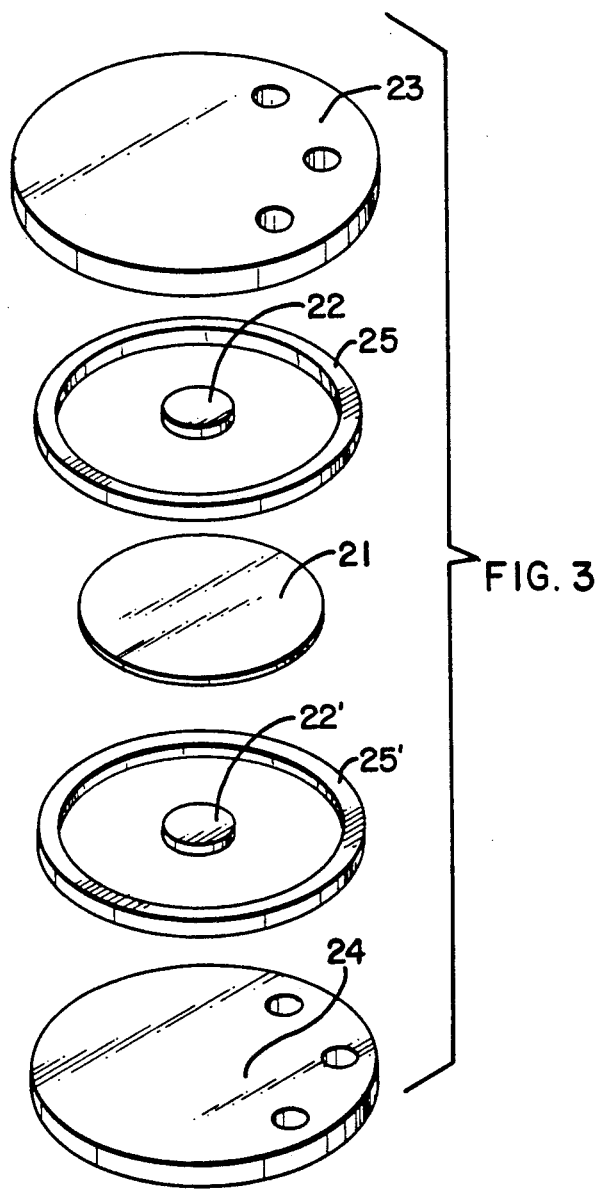
FIG. 3 is an exploded view of an acceleration transducer in accordance with a second embodiment of the present invention.

Referring first to FIGS. 1 and 2, there is shown the capacitive transducer 13 on a metallized printed wiring board (PWB) 1 having electronics 14 thereon in accordance with the present invention. The PWB can be formed of ceramic, epoxy or other well known material from which PWBs are generally fabricated. Metallization on the printed wiring board 1 acts as the fixed capacitor plate of the transducer.

The metallization on the PWB, preferably of copper, includes a source ring 2 which is generally connected to an oscillator, a detect region 3 within the source ring connected to the electronics 14 and a guard ring 4 surrounding the detect region. The detect region 3 picks up the AC signal from the source ring 2 connected to the beam mass support structure and the charge collected thereon is an indication of the instantaneous capacitance of the capacitor. The guard region 4 minimizes surface currents from the source ring 2, which is oscillating in voltage, to the detect region 3. A preform spacer 5 is placed on the source ring 2 and provides electrical contact to the spring/mass element 6. The spacer 5 can be an electrical conductor such as, for example, an epoxy or it can be an insulator with an electrical conductor disposed thereacross. The spring/mass element 6 is composed of a support ring 7 of electrically conductive material, an electrically conductive beam 8 which acts as the spring of the system and an electrically conductive mass 9 which deflects under a given acceleration, inducing a capacitance change relative to the detect region 3. The beam 8 is secured to the support ring 7 and conductive mass 9. The support ring 7 and conductive mass 9 are generally of the same thickness and lie generally in the same plane. The spring/mass element 6 is assembled as a unit on a flat surface with a low stress inducing bonding means (solder, brazed, epoxy or other adhesive, spot weld or laser weld). The flatness of the spring/mass element 6 is unaffected by beam variations. A second preform electrically conductive epoxy spacer 10 is placed on the support ring 7 and spaces a section of double sided metallized printed wiring board 11 therefrom. This section of PWB is optional and assists in shielding from stray capacitances by being part of the overall ground plane which contains the other side of the printed wiring board. The PWB 1 also contains electronic circuitry 14 thereon to which the capacitor is coupled. The above described PWB can be modified to have electronics on one surface thereof and the transducer on a different or opposing surface thereof.

The system as described above displays essentially no temperature effect to the first order when the temperature coefficient of expansion of the printed wiring board 1, the spacers 5 and 10, the board 11 and the support ring 7 are matched. The fact that a single beam 8 is used permits the conductive mass 9 to move in all directions, thereby minimizing the requirement that the beam or mass be temperature matched to the remaining components.

The device as described above also provides protection against overload by providing stops by the upper and lower circuit board sections 1 and 11 which prevent excess vertical movement by the electrically conductive mass 9. Squeeze film damping is provided by the circular flat mass moving relative to the circuit boards. The spacing between the mass and overload stops is preferably less than or equal to 0.005 inches to obtain significant initial capacitance changes in capacitance and damping. The beam and/or mass dimensions can be modified to change the level of accelerations sensed and the frequency range desired. A differential capacitance mode could be obtained with slight modifications to the sensor if more signal is desired. The sensor is contained on a single printed wiring board, can be assembled with automated machinery and provides for simple edgecard connection along the pads 12 on the PWB. The whole assembly can be overmolded for environmental protection.

In operation, the source ring 2 is coupled through the spacer 5 and the support ring 7 to the conductive mass 9 as well as to the electronics 14. The detect region 3 is also coupled to the electronics 14. Accordingly, as the conductive mass 9 moves due to acceleration and changes thereof, the capacitive coupling between the mass and the detect region 5 changes, resulting in a change in the charge on the detect region, this change being detected by the electronics to provide a readout related to acceleration.

Figure 4:
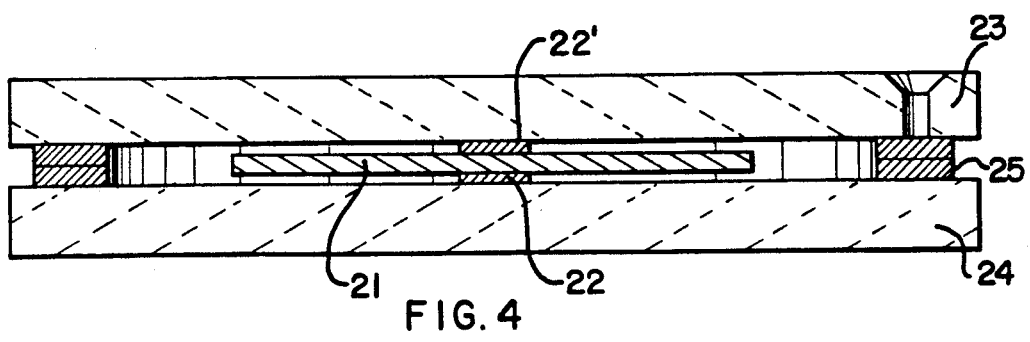
FIG. 4 is a cross sectional view of the assembled transducer of FIG. 4.

Referring now to FIGS. 3 and 4, there is shown a second embodiment in accordance with the present invention. The device comprises a thin, supported diaphragm or seismic disk 21 which acts as the seismic mass and spring of the accelerometer system. Supports 22 and 22' of conductive epoxy adhesive with glass spacers are electrically coupled to the diaphragm 21 and are disposed on opposite sides of the diaphragm to control capacitor function. An upper ceramic plate 23 with metallization thereon (not shown) acts as a mechanical stop as well as a fixed capacitor plate. The lower ceramic plate 24 also acts as a mechanical stop. Both plates 23 and 24 combined with the flexible diaphragm 21 determine the damping ratio of the system. Damping is provided by viscous air flow between the moving diaphragm 21 and plates 23 and 24 (squeeze film damping). The sealing of the device is accomplished with a non-conductive epoxy adhesive 25 around the periphery of the plates 23 and 24. The electronics (not shown) are connected to source (capacitor plate), detect (diaphragm) and guard ring (to protect detect from stray surface currents). Connection to the capacitor is made by contact to the metallization on the plate 23 and to a conductor on the plate 23 or 24 which is coupled to one of the supports 22 or 22'.

The device allows for little stray capacitance with this integrated electronic configuration and provides great overload protection with the plates acting as mechanical stops. The diaphragm dimensions can be changed to add flexibility to the level of accelerations sensed and the frequency range desired.

Figure 5A:
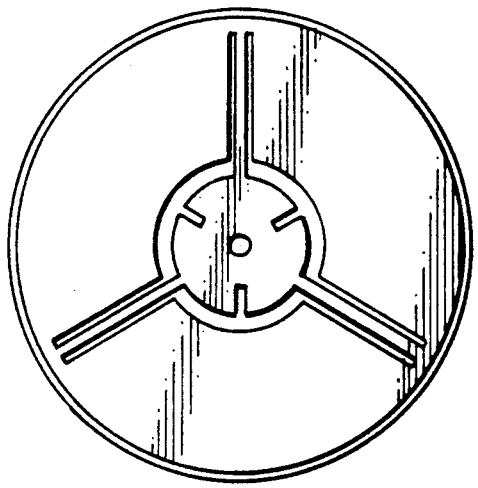
FIGS. 5a and 5b are illustrations of other configurations for securing the seismic disc as well as the disk configurations.
Figure 5B:
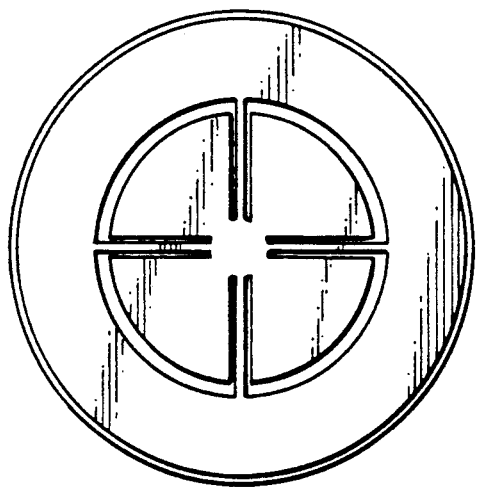

It should be noted that the seismic disk 21 can be secured at the center as shown in FIGS. 3 and 4 or secured at an edge as shown in FIGS. 1 and 2. The seismic disk 21 can also replace the beam/mass/support in FIGS. 1 and 2. FIGS. 5a and 5b are illustrations of other configurations for securing the seismic disc as well as the disk configurations. Seismic disks of the type shown in FIGS. 3, 4, 5a and 5b can be produced by stamping and/or photoetching and provide a single element where plural elements were previously required.

Figure 6A:
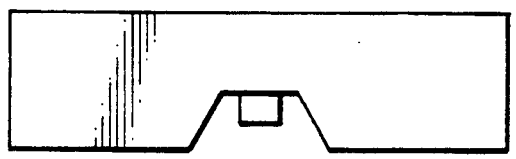
FIGS. 6a, 6b and 6c are side, top and cross sectional views showing a method of beam/mass/support fabrication resulting in a flat mass/support and fabricated in a batch or array assembly procedure.
Figure 6B:
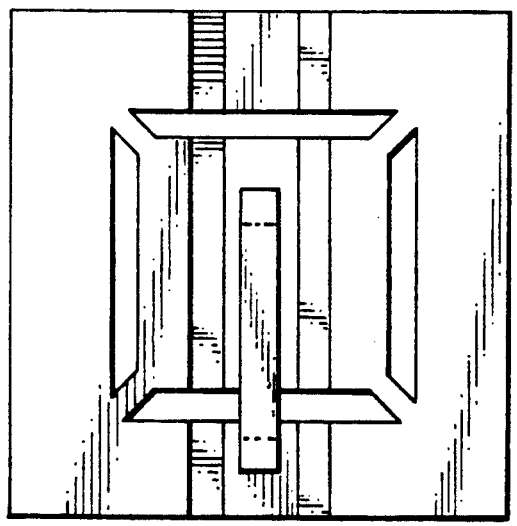
Figure 6C:
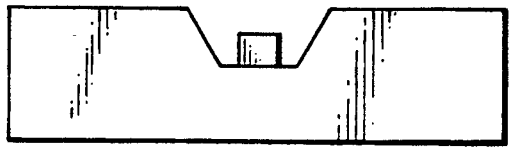

Referring now to FIGS. 6a, 6b and 6c, there is shown a process for fabrication of the beam, mass and support structure of the above described embodiment of FIGS. 1 and 2 as single units or as an array. The mass and support structure can be made as a sintered powder metal part with interconnecting tabs. This part can then be subsequently ground on both sides since the mass and support must be of substantially the same equal thickness and have substantially parallel or coplanar surfaces on both sides. A beam can then be attached via a low stress inducing proccess, e.g., laser welding, brazing or reflow soldering and then the interconnecting tabs can be separated by laser cutting. Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

We claim:

1. A capacitive accelerometer comprising a first substrate, a second substrate having a metallization thereon defining a fixed capacitor plate, a conductive metal disc, a pair of conductive epoxy supports secured to central portions of the metal disc at respective opposite disc sides securing the disc to respective substrates to disposed the disc in selected spaced relation to the substrates and the fixed capacitor plate to mount a disc rim for movement relative to the fixed capacitor plate in response to acceleration, sealing ring means secured to the substrates around the disc rim for sealing the accelerometer, and electronic means connected to the fixed capacitor plate and to a conductive epoxy support so that the disc rim and plate form a capacitor, the disc rim moves in response to acceleration to provide a change in capacitance of the capacitor corresponding to the acceleration, and the electronic means provide an output signal corresponding to the change of capacitance.

2. An accelerometer according to claim 1 wherein the central portion of the disc is connected to the disc rim by a plurality of arms extending from the central disc portion in a plurality of directions.

3. An accelerometer according to claim 1 having three arms spaced around the periphery of the central disc portion connected to the disc rim.

4. A capacitive accelerometer unit comprising a mass formed of a sintered metal powder, a support of sintered metal powder surrounding the mass, a plurality of integral tabs interconnecting the mass and support to be substantially coplanar, and a spring metal beam secured to the mass and support ring by low-stress attachment means selected from the group consisting of solders, brazing materials, welds and adhesives to retain the mass substantially coplanar to be response to acceleration to move relative to the support, whereby the support is adapted to be secured in selected spaced relation to a fixed capacitor plate and to have the tabs removed to disposed the mass in selected spaced relation to the plate to form a capacitor and to permit movement of the mass in response to acceleration to produce a change in capacitance of the capacitor corresponding to the acceleration.

* * * * *